(12) United States Patent
Marcus et al.

(10) Patent No.: US 8,739,091 B1
(45) Date of Patent: May 27, 2014

(54) TECHNIQUES FOR SEGMENTING OF HARDWARE TRACE AND VERIFICATION OF INDIVIDUAL TRACE SEGMENTS

(71) Applicant: International Business Machines Corporation, Armonk, NY (US)

(72) Inventors: Eitan Marcus, Haifa (IL); Christopher J. Spandikow, Austin, TX (US); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/680,253

(22) Filed: Nov. 19, 2012

(51) Int. Cl.
*G06F 17/50* (2006.01)

(52) U.S. Cl.
USPC .......................................................... 716/107

(58) Field of Classification Search
USPC .......................................................... 716/107
See application file for complete search history.

(56) References Cited

U.S. PATENT DOCUMENTS

| | | | |
|---|---|---|---|
| 5,615,357 A | 3/1997 | Ball | |
| 6,748,564 B1 | 6/2004 | Cullen et al. | |
| 7,424,646 B2 | 9/2008 | Smith | |
| 7,546,220 B1 | 6/2009 | Patlashenko et al. | |
| 7,739,667 B2 | 6/2010 | Callahan, II et al. | |
| 7,797,585 B1 | 9/2010 | Sahin et al. | |
| 7,975,182 B2 | 7/2011 | St. Onge et al. | |
| 7,984,338 B2 | 7/2011 | Walker et al. | |
| 2004/0205718 A1 | 10/2004 | Reynders | |
| 2005/0209840 A1* | 9/2005 | Baklashov et al. | 703/22 |
| 2006/0190871 A1* | 8/2006 | Likovich et al. | 716/5 |
| 2008/0133883 A1* | 6/2008 | Glew | 712/32 |
| 2008/0307203 A1 | 12/2008 | Bell, Jr. et al. | |
| 2010/0077366 A1* | 3/2010 | Bjesse | 716/5 |

* cited by examiner

*Primary Examiner* — Thuan Do
*Assistant Examiner* — Mohammed Alam
(74) *Attorney, Agent, or Firm* — Mitch Harris, Atty at Law, LLC; Andrew W. Harris; Matthew W. Baca

(57) ABSTRACT

A logic verification program, method and system that segments simulation results and then processes the resulting segments separately, and optionally in parallel, reduces memory and other system requirements and improves efficiency of verification of digital logic designs. The verification process fixes up event dependency check for past-directed checkers by including additional information with each segment after an initial segment that describes at least a portion of a state of the logic design, so that resultant events in the current segment that are caused by events in the previous segment(s) can be traced back to those events. Future directed checks are fixed-up by either repeating a failed check with a concatenation of the current segment and a next segment, or by providing an overlap between segments to ensure that the expected time duration between a causative event and the resulting event are included within the same segment file.

18 Claims, 5 Drawing Sheets

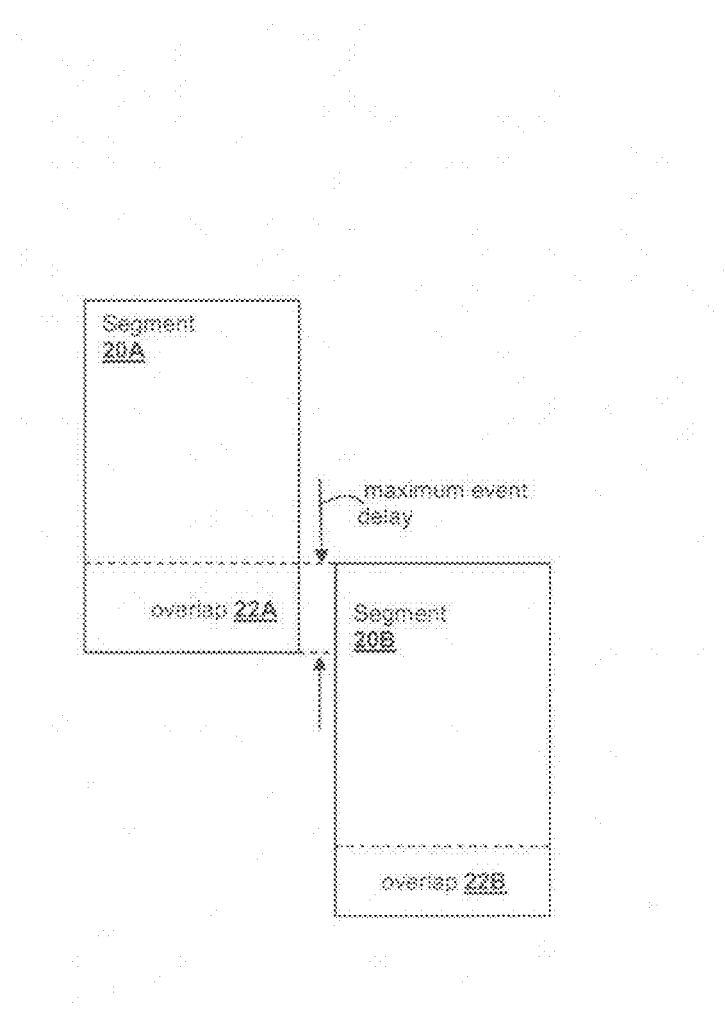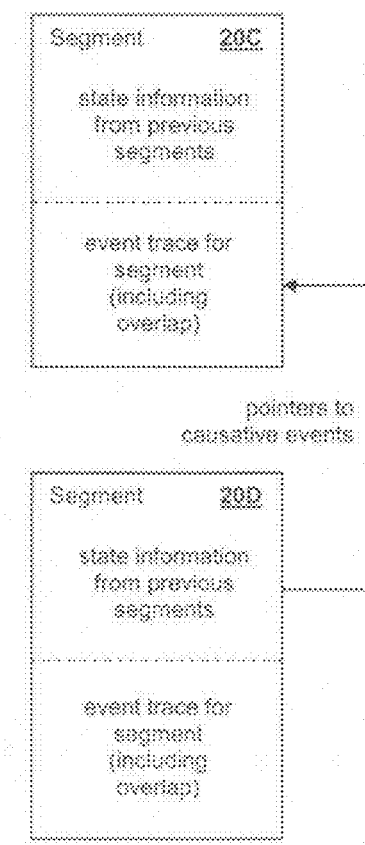
Fig. 2A
Fig. 2B

TECHNIQUES FOR SEGMENTING OF HARDWARE TRACE AND VERIFICATION OF INDIVIDUAL TRACE SEGMENTS

BACKGROUND OF THE INVENTION

1. Field of the Invention

The present invention is related to verification of circuit simulation trace file results, and in particular, to techniques for handling trace file results that are segmented into multiple output files to reduce storage and addressing requirements.

2. Description of Related Art

Logic simulators, including emulators and accelerators that can be implemented in hardware, software or a combination of both, are typically are used in verification of designs of processor integrated circuits (ICs), as well as other large-scale logic. The logic simulators generate a simulation output representing the behavior of the hardware being simulated. Checkers then check certain behaviors (events) in the simulation output and verify that the detected events correspond to expected causative events and/or that all events that should cause a resulting event have a corresponding correct resulting event. Verification can either be performed on-line, in which checking is performed on the trace, or off-line, in which the trace is stored in a file and processed later.

With the large and complex devices available today, the off-line trace output files can easily become unwieldy, for example, the size of a resulting trace file may exceed a computer system's maximum file size. Further, the efficiency of algorithms that perform the above-described event-checking can be dependent on the amount of memory occupied by the data being analyzed and the fact that a sequential process such as simulation does not lend itself to parallel processing.

Solutions of the above problem typically reduce the size of the resulting trace file by sampling, i.e., by not exhaustively verifying the design. Therefore, an alternative technique for off-line verification is desired.

BRIEF SUMMARY OF THE INVENTION

The invention is embodied in a computer-performed method, computer system and computer program product that segment simulation results to make them more manageable, while still providing full checking functionality. The computer system is a computer system executing program instructions for carrying out the method and the computer program product is a program for carrying out the method.

The method simulates and/or emulates the logic design to obtain a sequence of states describing the behavior of the logic design and segments the resulting trace file into multiple simulation segments stored in multiple sets. The method then processes the segments individually to verify the behavior of the logic design, by reading the individual sets, checking correspondences between events stored in a current segment and additional information indicating events corresponding to the state of the simulation at the start of the current segment. The additional information provides a "fix-up" for the lack of state/event information from the result of all of the previous segments, so that verification can be performed using smaller sets of results and optionally processed in parallel, so that results of verification of earlier segments are not needed for performing verification of subsequent segments.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 2A and FIG. 2B are pictorial diagrams of file structures that can be employed in embodiments of the present invention.

DETAILED DESCRIPTION OF THE INVENTION

Figure 1:
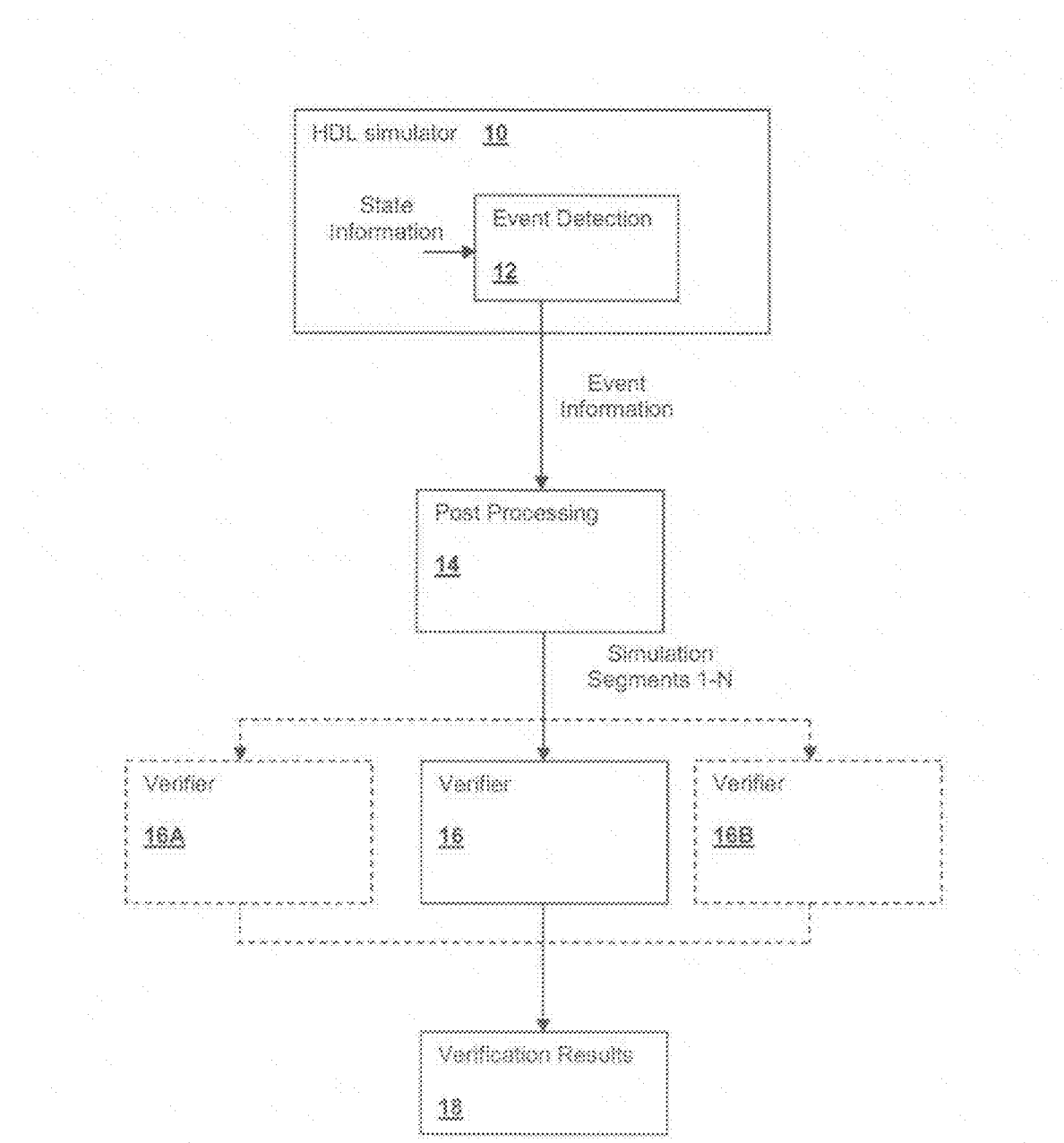
FIG. 1 is a is a pictorial diagram depicting information flow in embodiments of the present invention.

The present invention encompasses computer-performed methods and programs for simulating digital logic circuits and segmenting the resulting trace file into multiple segments. The segments following the initial segment are handled by various techniques that fix up the checking of causative and resultant events, to reduce the memory requirements for performing the checking and optionally so that sequential checking of the entire trace result is not required and parallel processing can be applied to the segments to verify the digital logic circuit design. For the purposes of the present application, it is useful to categorize the checking operations used by the verifier into two classes:

Forward-looking checkers—checkers that check for a response event resulting from a current event (including particular state combinations). Generally responses will be close in time to the triggering event, e.g., grant of service in response to a request for service.

Past-looking checkers—checkers that detect an event or particular state combination and check for a valid causative event, state or event/state combination in the past. There is no guarantee that causative event, state or event/state combination will be close in time to the detected event or particular state combination, e.g., the value of a memory read operation may be determined by a memory write operation arbitrarily remote in the past.

To handle checking a segmented trace, the segments must be "fixed-up" by providing additional information that provides information needed by the above-described past-looking checkers. Forward-looking checkers can miss a resulting event when the interval during which the resulting event is pending crosses a segment boundary. For forward-looking checkers, one solution is to overlap the segments, where the overlapping region spans the longest expected time that the response to a triggering event or state combination can be pending. A failure is logged when the response is not detected during the processing of the segment, since the response has not occurred within the expected time. An alternative is to detect such a failure at the end of the segment without providing overlap, and then to concatenate the next segment with the current segment. The check is then re-run on the concatenated segment to determine whether the resulting response has occurred within the expected time.

Similarly, a past-looking checker may need state information from an arbitrarily earlier point in time, and thus from any previous segment. So, to provide a "fix-up" for past-looking checkers, information indicative of the causes of at least a portion of the initial state of the logic in a segment is included with the segment of the trace, so that the checker can verify that an event is due to a correct cause or to determine that a state is a correct value. The additional information may be provided in the file containing the segment, or may be stored in a separate location. The additional information may be a pointer into another segment file, so that a verifier can locate the needed information from a previous segment. Such pointer information is useful for debugging, as in addition to including a state that a past-looking checker can use to determine the cause of an event, the pointer can provide detailed debugging information as to the state of the machine surrounding the causative events and/or state of the machine at the time the cause of the event arose.

Referring now to FIG. 1, a technique for verifying a logic design in accordance with an embodiment of the present invention is shown. The technique is a method performed by a computer system that verifies a logic design, which may be embodied in a computer program stored on a computer readable storage medium. A VHSIC (Very High Speed Integrated Circuit) Hardware Description Language (HDL) simulator 10 generates a wave output containing sequential state information, and a set of event detection statements 12 implemented in the HDL description processed by HDL simulator 10 generate event information. The event information is received by a post processing block 14 in accordance with an embodiment of the invention that segments the output of HDL simulator 10 into multiple simulation segments. One or more verifiers 16, 16A, 16B, along with additional verifiers up to the number of simulation segments generated, verify the logic design to produce verification results 18 that include whether the logic design passed all of the checks intended to confirm that the logic design meets intended performance and operation criteria, as well as information useful for determining the cause of any check failures. Verifiers 16, 16A, 16B determine whether the expected relationship between detected events and related causative conditions or expected resulting other events is present in the operation of the logic design. Verifiers 16, 16A and 16B will generally be identical program code/ verifier scripts, and will generally employ both past-looking checkers and forward-looking checkers.

Since the verification performed in prior art systems typically processes the output of HDL simulator 10 sequentially, parallel processing possibilities are limited. Using the verification techniques of the present invention, the segments generated by post processing block 14 can be processed sequentially, but can also be processed in parallel without limitation. In general, sequential processing of simulation outputs provides that the state of the logic design proceeds in an ordered manner, with future-looking checks cached for resolution as the verification proceeds and with past-looking checks enabled to look back to previous input states/events that provide the information needed for the past-looking checker. However, with the segmented output of the present invention, it is necessary to fix-up the segments, i.e., to prepare additional information such that past-looking checks can be satisfied without interaction between verifiers 16, 16A and 16B and without requiring processing of the entire simulation output file by each verifier.

Referring now to FIG. 2A, a pair of trace segments 20A, 20B generated by post processing block 14 of FIG. 1, are illustrated in accordance with an embodiment of the present invention. In order to handle forward-looking checks, trace segment 20A contains an overlap portion 22A of next trace segment 20B so that forward-looking checkers that have not found a resulting expected event from a triggering event/;state occurring in the non-overlap portion of trace segment 20A will find the resulting event in the overlap portion 22A. If the resulting event is not found in trace segment 20A, including overlap portion 22A, a failure is generated. Overlap portion 22A is not processed to detect triggering events/states, only processed to locate missing resulting events, thereby preventing a triggering event/state from being detected in two segments, as the events in overlapping portion 22A are processed as part of the processing of trace segment 20B, which has its own overlapping portion 22B of the next segment which is also not processed during processing of trace segment 20. As mentioned above, the overlap is not required to handle forward-looking checks, since, as an alternative, when an expected resulting event due to an event and/or state in the current segment is not detected within the current segment, the next segment is concatenated with the current segment and the particular check is re-run. The concatenation may just include an overlap portion, e.g., upon failing to locate a resultant event expected in trace segment 20A, overlapping portion 22A can be subsequently appended to trace segment 20A, instead of appended a priori as illustrated in FIG. 2A.

Referring now to FIG. 2B, a pair of trace segments 20C, 20D generated by post processing block 14 of FIG. 1, are illustrated in accordance with another embodiment of the present invention. In order to handle past-looking checks, trace segments 20C and 20D contain state information from previous trace segments that are flagged for expected relationships to corresponding future events that may be detected in trace segments 20C and 20D, respectively, e.g., the initial contents of relevant registers and on-board caches in a processor design at the end of the previous trace segment that will be implicated by future read operations. A fixup information block may be located within the files containing trace segments 20C, 20D, as shown, or the corresponding fixup information file/database entry may be provided for each segment. The events in previous segments can be referred to by a pointer for debugging, so that detailed past state information generated by HDL simulator 10 can be retrieved from another trace segment to determine the cause of, for example, an incorrect memory read value.

Figure 3:
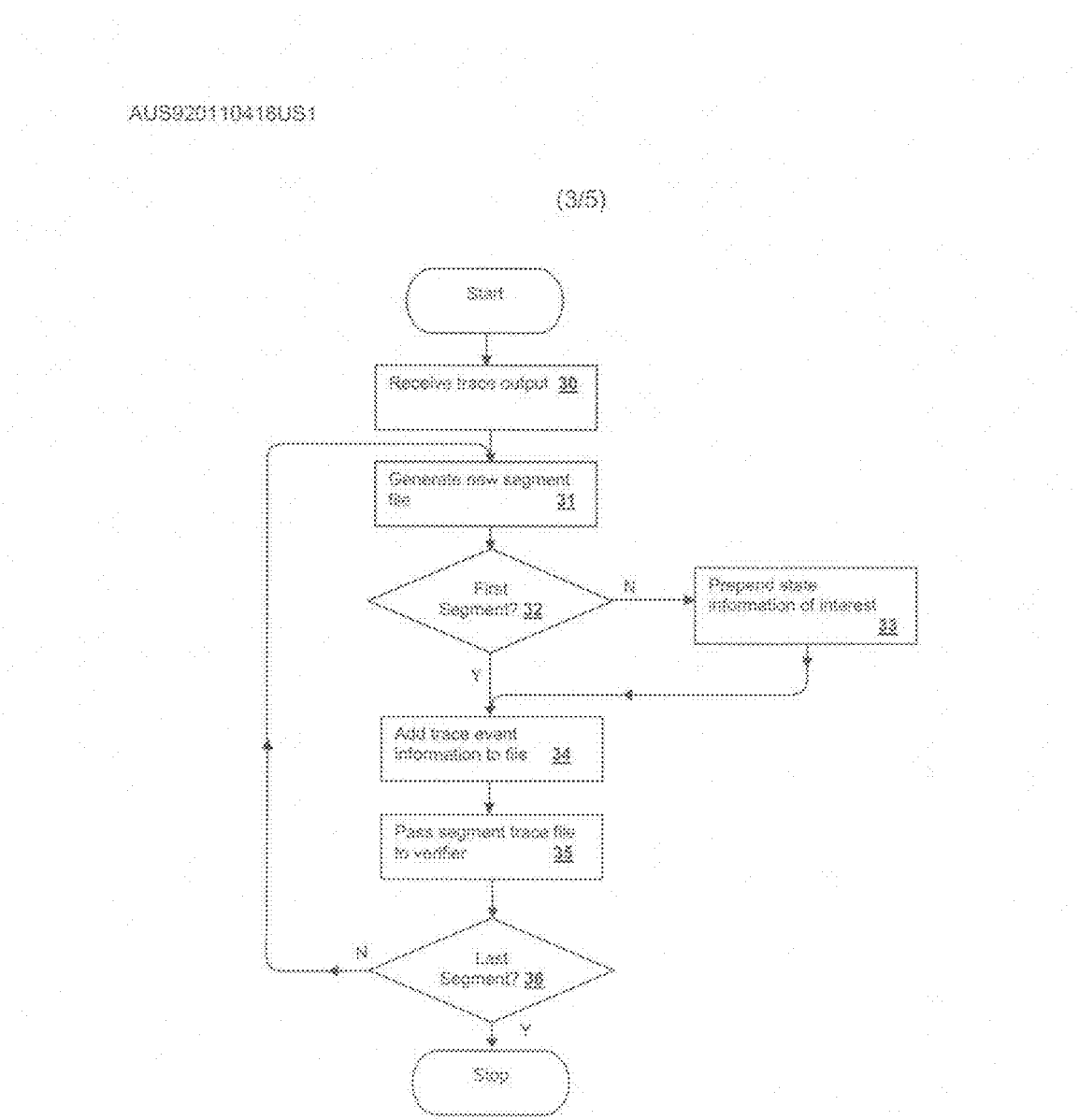
FIG. 3 is a flow chart depicting a method of segmenting files in accordance with an embodiment of the present invention.

Referring now to FIG. 3, a method for segmenting a simulation trace output is shown, according to an embodiment of the present invention. The trace output is received (step 30) and a segment file is generated (step 31) if the segment is not the first segment (decision 32), then state information of interest, i.e., state information that will be determinative of events that the verifier may check, is pre-pended to the segment trace data (step 33). The segment trace information is added to the segment file (step 34) and the segment file is then passed on to the verifier (step 35). Finally, unless the segment is the last segment (decision 36), the next segment file is generated (step 31). Step 34 adds trace event information to the file, which in the non-overlapped case, starts adding trace information to the next segment where it left off with the previous. In the overlapped case, step 34 adds the same trace information that was added at the end of the previous segment, according to an overlap interval that ensures that sufficient time is allowed for any expected event delays to elapse.

Figure 4:
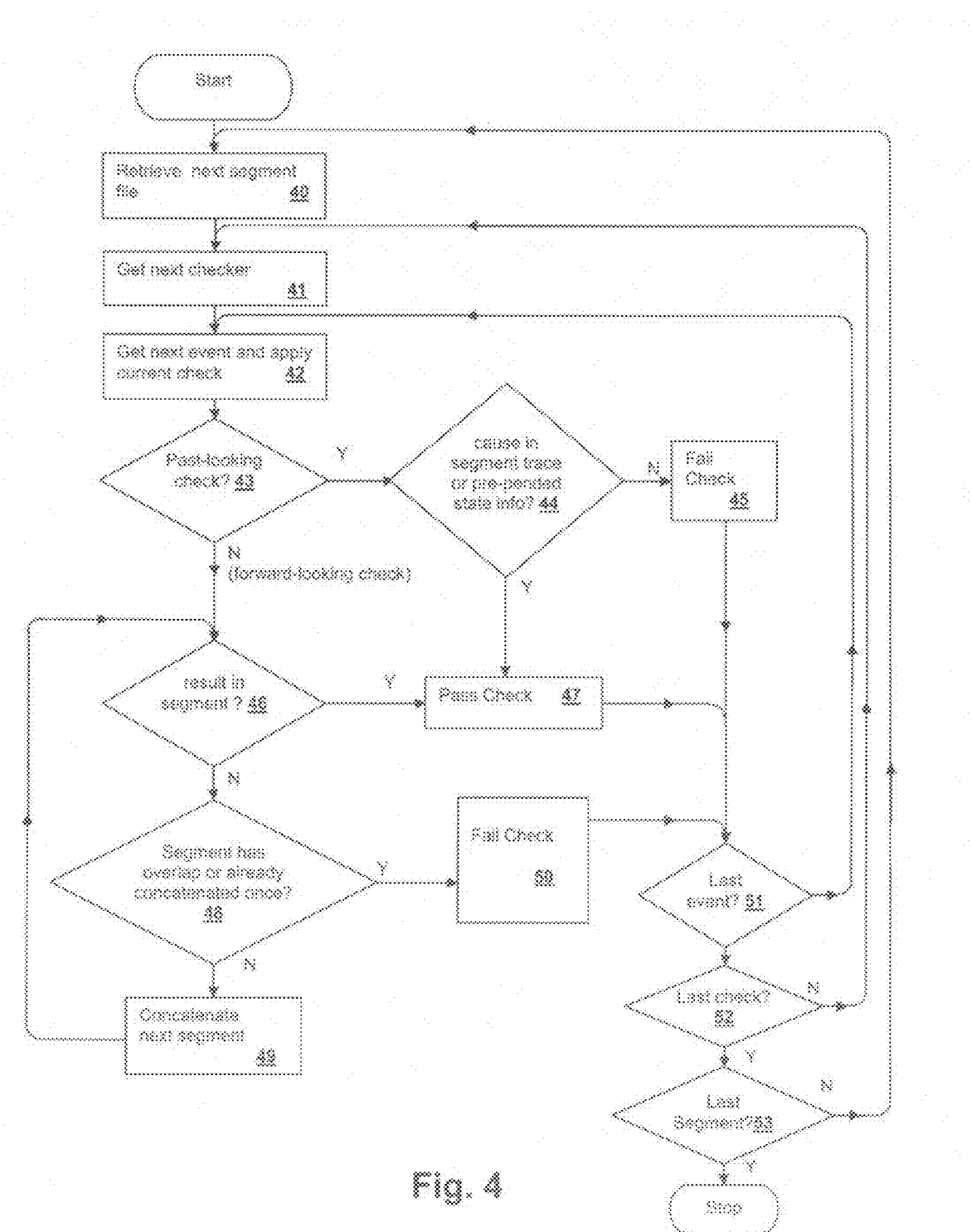
FIG. 4 is a flow chart depicting a verification method in accordance with an embodiment of the present invention.

Referring now to FIG. 4, a method for verifying a logic design is shown, according to an embodiment of the invention. The depicted method retrieves a segment file generated by HDL simulator 10 (step 40), gets the next checker (step 41) and applies the check to the next event (step 42). If the check is a past-looking check (decision 43), then if the correct cause is not found in the segment trace data or the pre-pended state information (decision 44), then the check is failed (step 45). Otherwise, the check is passed (step 47) and until the last event for the segment is reached (decision 51), the process is repeated from step 42. If the check is a forward-looking check (decision 43), if the resulting event is found in the segment (decision 46), the check is passed (step 47) and until the last event of the segment is reached (decision 51), the process is repeated from step 42. If the resulting event is not found in the segment (decision 46), then if there is no overlap previously provided (i.e., the implementation of the process of FIG. 3 does not overlap segments) and the next segment has not already been concatenated by step 49 with the current segment (decision 48), then the next segment is concatenated (step 49) and the checking is repeated from decision 46. Otherwise, the check is failed (step 50) and until the last event of the segment is reached (decision 51), the process is repeated from step 42. Until the last check has been applied to every event in the segment (decision 52), the next checker is loaded (step 41) and the corresponding check applied to each event in steps 42-51. Until the last segment has been verified (decision 53) the next segment is retried (step 40) and the checkers are applied to each event in the segment via steps 41-52. Alternatively, the verification can be halted on a failed check, depending on the desired process flow. While the flowchart of FIG. 4 illustrates sequential processing of the segments, none of the steps for a given segment are contingent on processing prior segments, thus the process from step 41 through step 52 can be performed in parallel for the different segments, and the process from step 41 through step 51 can be performed in parallel for each checker. The checker and event check loops can be interchanged in accordance with an alternative embodiment of the invention, with checks applied sequentially to each event in a segment before loading the next checker.

Figure 5:
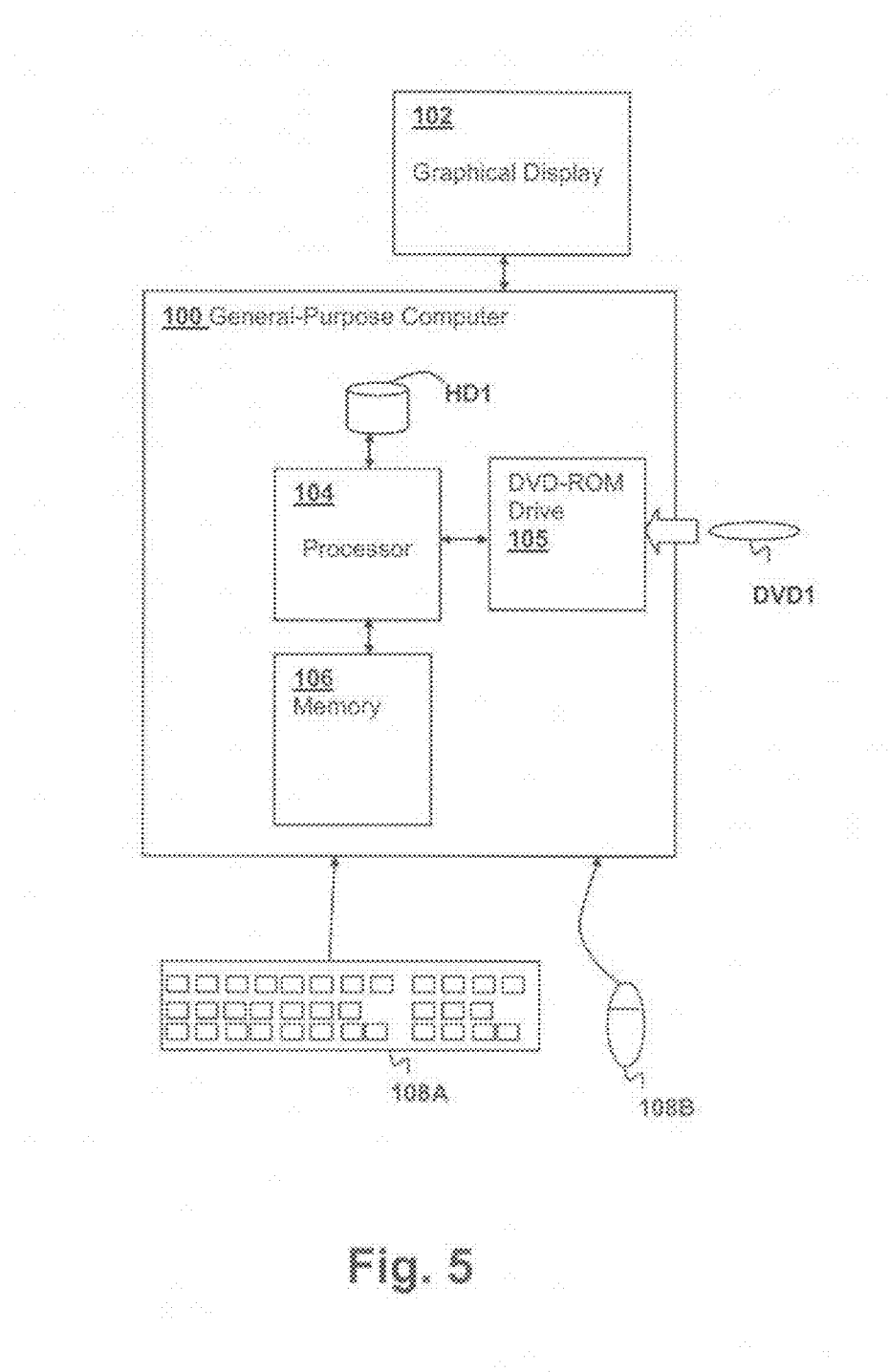
FIG. 5 is a block diagram illustrating a computer system in which program code according to an embodiment of the present invention implementing a method according to an embodiment of the invention is executed.

Referring now to FIG. 5, a computer system in which the above-described computer-performed methods are performed, is shown. A general-purpose computer 100 is coupled to a graphical display 102 for display of verification results, as well as user interface screens for controlling one or more programs including programs forming computer program products including program instructions for carrying out the methods described above. Input devices such as a keyboard 108A and a mouse 108B provide for user interaction with general-purpose computer 100. General-purpose computer 100 includes a processor 104 for executing program instructions stored in a memory 106 including program instructions forming the above-described computer program products in accordance with embodiments of the invention. A removable storage device, such as a DVD-ROM drive 105 is included for accepting storage media such as DVD-ROM DVD1 forming a computer program product in accordance with an embodiment of the invention. The computer system depicted in FIG. 5 is only one example of a computer system such as a desktop computer system or a notebook computer system that can be used to perform the verification described above. Other types of computer systems, including distributed and networked computer systems in which some or all of the algorithms and portions thereof are executed remotely are within the scope of the invention as contemplated herein, and the system depicted in FIG. 5 should not be construed as limiting the type of computer system or computer program products that form embodiments of the present invention.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method performed by a general-purpose computer system that verifies a logic design, the method comprising:
   capturing behavior of at least a portion of the logic design with a computer system to obtain a sequence of events during sequential simulation or operation of the logic design;
   segmenting results of the capturing into multiple segments corresponding to different sequential intervals of the simulation or operation, wherein the multiple segments are stored within the computer system;
   processing, by the computer system, the segments individually to verify the behavior of the portion of the at least a portion of logic design, wherein the processing comprises reading individual ones of the multiple segments, checking correspondences between events stored in a current segment, and additional information indicating events in the simulating or operation of the logic design corresponding to a segment other than the current segment;
checking the events stored in the corresponding ones of the multiple segments for correct resulting events, wherein the checking checks for resulting events within the current segment;
responsive to the checking not finding a resulting event corresponding to a causative event in the current segment, concatenating at least a portion of a next one of the multiple segments with the current segment to provide the additional information; and
repeating the checking on the concatenated current segment.

2. The computer-performed method of claim 1, wherein the processing further comprises:
storing at least some of the events corresponding to the current segment as the additional information in a next one of the multiple segments; and
checking the events stored in the corresponding ones of the multiple segments for correct causative events, wherein the checking checks for causes within the current segment due to the stored events from the current segment and the stored additional information from a previous segment.

3. The computer-performed method of claim 2, wherein the multiple segments are stored in multiple corresponding files, wherein each segment and corresponding additional information from a previous segment are stored in a single file.

4. The computer-performed method of claim 1, wherein the processing processes multiple ones of the segments simultaneously using parallel processes.

5. The computer-performed method of claim 1, wherein the additional information comprises pointers to events detected in the previous segment corresponding to states of the logic design present at the beginning of the current segment.

6. The computer-performed method of claim 1, further comprising concatenating at least a portion of a next one of the multiple segments with the current segment so that all resulting events resulting from causative events in the current segment are expected to be found in the concatenated current segment.

7. A computer system comprising:
a processor for executing program instructions;
a storage for storing the program instructions, wherein the program instructions are program instructions for verifying a logic design, wherein the program instructions comprise program instructions for capturing behavior of at least a portion of the logic design with a computer system to obtain a sequence of states during sequential simulation or operation of the logic design, segmenting results of the capturing into multiple segments corresponding to different sequential intervals of the simulation or operation, wherein the multiple segments are stored within the computer system, and processing, by the computer system, the segments individually to verify the behavior of the portion of the at least a portion of logic design, wherein the processing comprises reading individual ones of the multiple segments, checking correspondences between events indicated by the states stored in a current segment, additional information indicating events occurring at states in the simulating or operation of the logic design corresponding to a segment other than the current segment, checking the events stored in the corresponding ones of the multiple segments for correct resulting events, wherein the program instructions for checking check for resulting events within the current segment, responsive to the program instructions for checking not finding a resulting event corresponding to a causative event in the current segment, concatenating at least a portion of a next one of the multiple segments with the current segment to provide the additional information, and repeating the checking on the concatenated current segment.

8. The computer system of claim 7, wherein the program instructions further comprise program instructions for:
detecting events within the sequence of states;
storing the events in corresponding ones of the multiple segments, such that events corresponding to a current segment are stored in a corresponding current one of the multiple sets;
storing at least some of the events corresponding to the current segment as the additional information in a next one of the multiple segments; and
checking the events stored in the corresponding ones of the multiple segments for correct causative events, wherein the checking checks for causes within the current segment due to the stored events from the current segment and the stored additional information from a previous segment.

9. The computer system of claim 8, wherein the multiple segments are stored in multiple corresponding files, wherein each segment and corresponding additional information from a previous segment are stored in a single file.

10. The computer system of claim 7, wherein the program instructions for processing are program instructions that process multiple ones of the segments simultaneously using parallel processes.

11. The computer system of claim 7, wherein the additional information comprises pointers to events detected in the previous segment corresponding to states of the logic design present at the beginning of the current segment.

12. The computer system of claim 7, wherein the program instructions further comprise program instructions for concatenating at least a portion of a next one of the multiple segments with the current segment so that all resulting events resulting from causative events in the current segment are expected to be found in the concatenated current segment.

13. A non-transitory computer program product comprising a computer-readable storage medium storing program instructions for execution by a computer system, wherein the program instructions are program instructions for verifying a logic design, wherein the program instructions comprise program instructions for:
capturing behavior of at least a portion of the logic design with a computer system to obtain a sequence of states during sequential simulation or operation of the logic design;
segmenting results of the capturing into multiple segments corresponding to different sequential intervals of the simulation or operation, wherein the multiple segments are stored within the computer system;
processing, by the computer system, the segments individually to verify the behavior of the portion of the at least a portion of logic design, wherein the processing comprises reading individual ones of the multiple segments, checking correspondences between events indicated by the states stored in a current segment, and additional information indicating events occurring at states in the simulating or operation of the logic design corresponding to a segment other than the current segment;

checking the events stored in the corresponding ones of the multiple segments for correct resulting events, wherein the checking checks for resulting events within the current segment;

responsive to the program instructions for checking not finding a resulting event corresponding to a causative event in the current segment, concatenating at least a portion of a next one of the multiple segments with the current segment to provide the additional information; and repeating the checking on the concatenated current segment.

14. The computer program product of claim 13, further comprising program instructions for:

detecting events within the sequence of states;

storing the events in corresponding ones of the multiple segments, such that events corresponding to a current segment are stored in a corresponding current one of the multiple sets;

storing at least some of the events corresponding to the current segment as the additional information in a next one of the multiple segments; and checking the events stored in the corresponding ones of the multiple segments for correct causative events, wherein the checking checks for causes within the current segment due to the stored events from the current segment and the stored additional information from a previous segment.

15. The computer program product of claim 14, wherein the multiple segments are stored in multiple corresponding files, wherein each segment and corresponding additional information from a previous segment are stored in a single file.

16. The computer program product of claim 13, wherein the program instructions for processing are program instructions that process multiple ones of the segments simultaneously using parallel processes.

17. The computer program product of claim 13, wherein the additional information comprises pointers to events detected in the previous segment corresponding to states of the logic design present at the beginning of the current segment.

18. The computer program product of claim 13, wherein the program instructions further comprise program instructions for concatenating at least a portion of a next segment with the current segment so that all resulting events resulting from causative events in the current segment are expected to be found in the concatenated current segment.

* * * * *